Nov. 6, 1923.
R. M. HOWDESHELL
1,473,233
PISTON FOR ENGINE CYLINDERS
Filed May 22, 1920     2 Sheets-Sheet 2
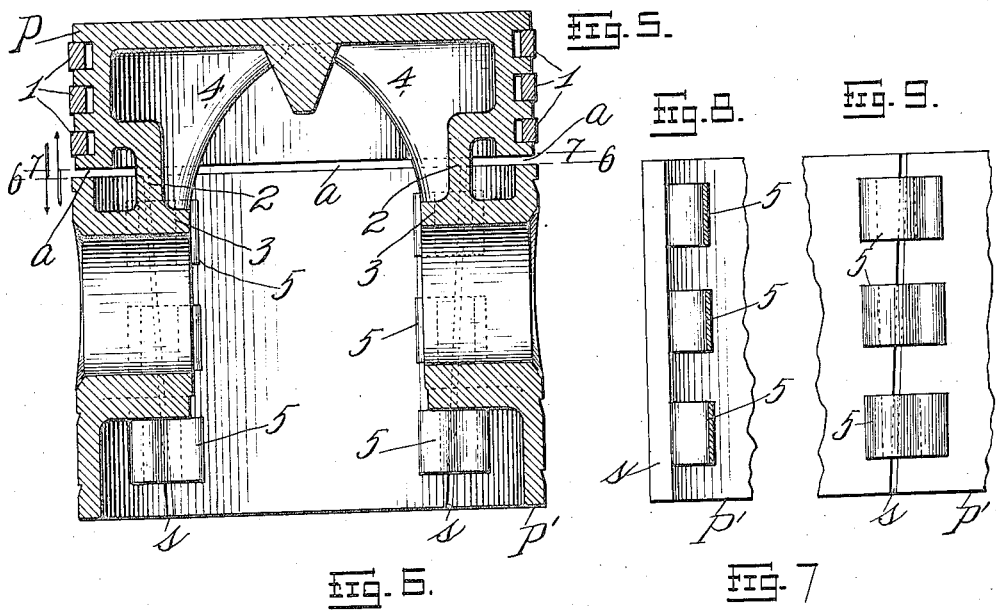
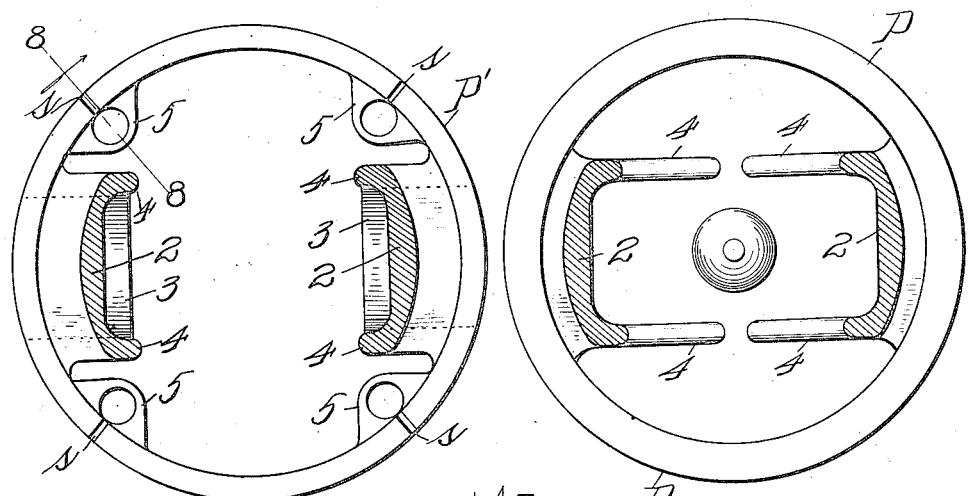
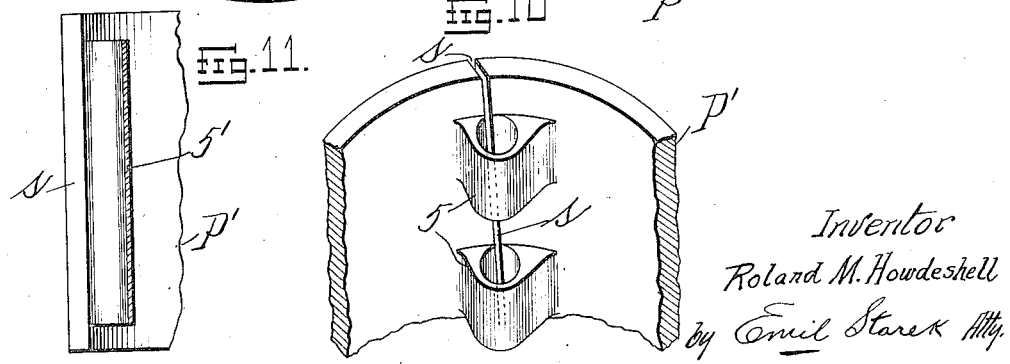
Inventor
Roland M. Howdeshell
by Emil Starek Atty.

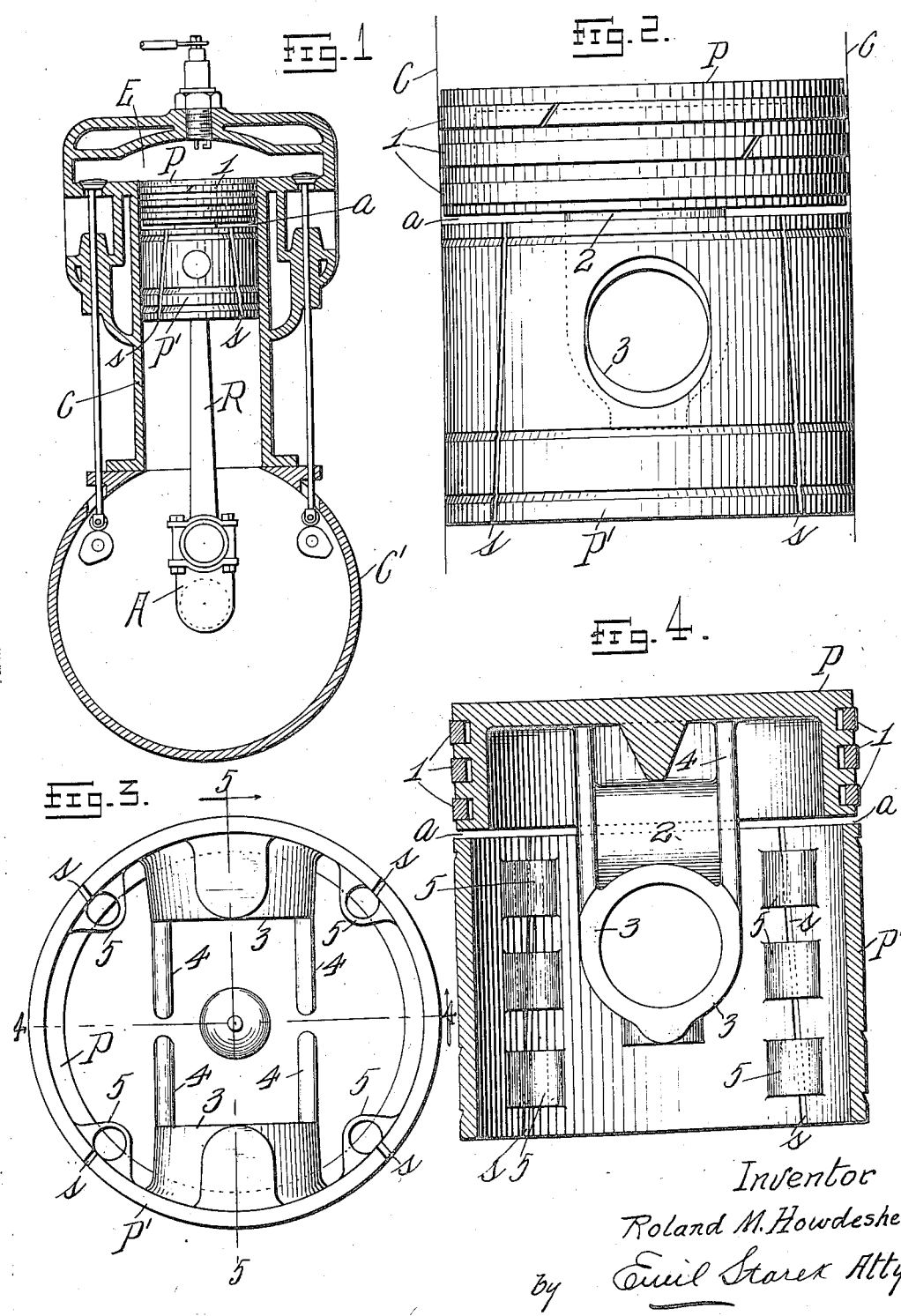

Patented Nov. 6, 1923.

1,473,233

UNITED STATES PATENT OFFICE.

ROLAND M. HOWDESHELL, OF ST. LOUIS, MISSOURI, ASSIGNOR TO H. & H. MACHINE COMPANY, A CORPORATION OF MISSOURI.

PISTON FOR ENGINE CYLINDERS.

REISSUED

Application filed May 22, 1920. Serial No. 383,519.

*To all whom it may concern:*

Be it known that I, ROLAND M. HOWDESHELL, a citizen of the United States, residing at St. Louis, State of Missouri, have invented certain new and useful Improvements in Pistons for Engine Cylinders, of which the following is a full, clear, and exact description, reference being had to the accompanying drawings, forming a part hereof.

The present invention is directed to improvements in piston construction, and particularly to pistons intended for use in internal combustion engines. One of the objects sought is to make use of pistons cast from aluminum or its alloys to secure lightness, and at the same time secure a fit between the piston and walls of the cylinder that will not only arrest or prevent side-slapping of the piston but will ensure against the passage of any oil past the piston into the combustion chamber of the engine. As well understood in the art, aluminum (and its alloys) has a comparatively high coefficient of expansion, so that an aluminum piston in an internal combustion engine must when cold, fit with considerable looseness in the cylinder to allow for subsequent expansion by the heat of the gases to which the piston is exposed while the engine is running. When operating at a high temperature (as a result of high speed) the piston by reason of expansion may of course maintain proper contact with the walls of the cylinder; but when the temperature drops (as when running at low speed) the contraction of the piston allows so much clearance between it and the cylinder walls as not only to cause side-slapping but at the same time to permit a flow of oil past the piston (and packing rings) into the combustion chamber and give rise to engine trouble. On the other hand, if an aluminum piston has the desired fit when cold, it will bind against and cut or score the walls of the cylinder when heated, and thus interfere with the free operation of the engine. With my improvement I not only avoid side-slapping of the piston but ensure against the passage of oil into the combustion chamber under all working conditions by providing the piston with a skirt so slit and with the sections between the slits so bonded or tied as to permit the skirt to yield circumferentially while expanding radially under the heat of the gases, the skirt being further insulated from the head of the piston by an air gap so as to materially reduce the transmission of the heat from the head to the skirt by conduction, the majority of the heat units being retained in the head and thereby ensuring a uniform expansion for the head and hence a uniform pressure of the packing rings carried thereby, against the walls of the cylinder. The improved piston contains further and other features, the advantages of which will be apparent from the following detailed description in connection with the accompanying drawings in which—

Figure 1 represents a middle longitudinal section through the cylinder and crank-case of an internal combustion engine, showing my invention applied thereto; Fig. 2 is an elevation of the piston detached, looking toward the hollow wrist-pin boss; Fig. 3 is a bottom plan of the piston; Fig. 4 is a middle longitudinal section on the line 4—4 of Fig. 3; Fig. 5 is a middle longitudinal section on the line 5—5 of Fig. 3; Fig. 6 is a cross-section through the circumferential air-gap on the line 6—6 of Fig. 5, looking toward the skirt of the piston; Fig. 7 is a cross-section through the air-gap on the line 7—7 of Fig. 5 looking toward the piston-head; Fig. 8 is a longitudinal sectional detail on the line 8—8 of Fig. 6 taken through one of the slits of the skirt; Fig. 9 is an inner face view of the bridge members spanning a slit of the skirt; Fig. 10 is a perspective showing the formation of the bridge members spanning a slit of the skirt; and Fig. 11 is a section similar to Fig. 8 showing a modified form of bridge member.

Referring to the drawings, and for the present to Figs. 1 to 10 inclusive, C, represents the cylinder, C', the crank-case, P, the piston-head, P', the skirt of the piston, R, the connecting rod coupling the piston to the crank-arms A of the crank shaft, the piston-head being equipped with the usual complement of split metal piston rings 1 as well understood in the art. In the present embodiment of my invention the skirt P' is slit in four places, the slits *s* being open at both ends of the skirt and preferably inclined to the axis of the piston and alternately converging toward the piston head and toward the free end of the skirt, the walls of the slits being parallel, and inclined to the radius of the piston (Fig. 3). As well understood in the art, the end of the piston facing the combustion chamber E of the engine is exposed to the greatest heat, and for this reason the head P is finished to a slightly smaller diameter than that of the skirt P', so as to leave the head free to expand toward the walls of the cylinder. In the prevailing constructions of pistons the greatest expansion would obviously be permanently confined to the end of the piston head adjacent the combustion chamber, the expansion progressively decreasing toward the skirt, the heat from the hottest end of the piston being conducted to the cooler portions farthest removed from the combustion chamber. It is obvious of course that until the entire piston was heated to an even temperature the greatest expansion would be at the end facing or nearest the combustion chamber. For this reason, and to allow for the initial increased expansion of the end of the piston facing said chamber, the piston-head in prevailing forms of pistons must be finished with a slight taper toward the end coming in contact with the burning gases; otherwise, and unless a sufficient clearance was allowed for between the cylinder walls and this end of the piston when cold, the increased expansion of the piston at this point of greatest heat would not only cause the piston to bind but would destroy the desired uniformity of expansion to which the piston head should be subjected, to produce an ideal piston. In my invention a substantially uniform expansion of the piston-head under working conditions is assured by preventing the heat imparted thereto by the combustion gases from being conducted to the skirt, this ensuring a quick heating of the piston-head to an even temperature and hence effecting an even expansion throughout. In the present embodiment of my invention the passage of the heat from the piston-head to the skirt is prevented by a circumferential air gap $a$ (or its equivalent) by means of which the skirt is spaced or insulated from the head, the only connection being by way of the webs or bridge pieces 2 leading from the hollow wrist-pin bosses 3, which span said gap at points diametrically opposite one another, the body portions of the webs clearing the inner walls of both the piston head and skirt (Fig. 5), the webs being connected to the end wall of the head by the stiffening ribs 4 as shown. It is apparent that while some of the heat will be conducted from the head to the skirt through the webs 2, it will be insufficient to affect the objects sought by my improvement. The skirt being slit longitudinally its full length, and the sections between the slits $s$ being separated from the piston head by the air gap $a$ with only two of the sections connected to the head by the webs 2, some provision must be made to hold the skirt sections together without impairing the resilience which the skirt must necessarily possess not only to prevent side-slapping, but to ensure against the scoring and cutting of the cylinder walls by the radial expansion of the skirt due to the heat which at high speeds and rapid burning of the gases must ultimately overtake it notwithstanding the presence of the air gap $a$ referred to. In the present embodiment of the invention the skirt sections are connected by a series of resilient bridge members or arches 5 bowed toward the axis of the piston and spanning the slits $s$, the arches spanning any slit being disposed about a common axis parallel to the axis of the piston, that is to say, parallel to the elements of the cylinder formed by the peripheral walls of the pistons. The bridge members 5 are thinnest at the crown of the arch so as to be comparatively resilient or yielding, the said members allowing the skirt sections to yield circumferentially, and radially inward and outward, and causing the sections when expanding under the heat in the cylinder to adjust themselves circumferentially to the cylinder walls, the bridge members exercising a sort of control over the skirt sections and arresting the latter while expanding under the heat of the gases, against an undue radial expansion, and thereby preventing the cutting and scoring of the cylinder walls which would inevitably result were the skirt sections free to expand radially outward their full limit and without restraint. The bridge members 5 restrain the skirt sections in that regard so that the skirt while resiliently hugging the cylinder walls to prevent side-slapping does not cut or score said walls. In practice, the piston is cast slightly oversize, that is to say, slightly larger than the bore of the cylinder, after which the skirt is slit as indicated, thereby imparting to the skirt sections between the slits a resiliency which a skirt without the slits does not possess. After the skirt is slit, the sections are slightly sprung inward and held in this position by a suitable jig or band and the piston placed in a lathe and turned true and finished smooth on the outside. When the skirt is released, the parts spring outward so that when the piston is inserted into the cylinder the skirt hugs the walls thereof throughout its full length with a resilient contact, preventing side-slapping or knocking when in service. It will be observed that the walls of the skirt are considerably thinner than those of the piston head, this arrangement not only ensuring resiliency for the skirt, but permitting the larger mass of metal in the head to absorb the bulk of the heat units communicated thereto by the gases, the gap $a$ intercepting the passage of this heat to the skirt.

To provide a slit or divided piston skirt which will resiliently engage the walls of the cylinder so as not only prevent side-slapping of the piston, but retard the flow of oil sufficiently to prevent undesirable quantities entering the combustion chamber, is the main object of the present invention in addition to employing a piston of light material for that purpose. I need not of course adhere to the precise details described as these may be changed in many ways without involving a departure from the scope or spirit of the invention. For example, in lieu of spanning the slits $s$ with a plurality of bridge members 5, a single bridge 5' may be employed for each slit as shown in the modification in Fig. 11. The construction may be modified in other ways falling within the purview of the skilled mechanic. From the foregoing it is apparent that it is not necessary to impart a taper to the piston-head, since, being subjected substantially to an even temperature and expansion throughout when in service, its expansion will be along the elements of a cylinder or along lines parallel to the elements of the inner walls of the cylinder in which the piston operates. The invention is of course not to be restricted in its application to any particular kind of engine; and while primarily designed for internal combustion engines it is not limited thereto. The heat non-conducting air gap $a$ may of course have substituted therefor an equivalent nonconductor of heat such as mineral wool, asbestos, and the like, or any material which will not cut the walls of the cylinder. I do not wish to be limited to the number of slits in the skirt, the four slits here shown being merely by way of example. Features shown but not alluded to are well understood in the art and require no description in the present connection.

Having described my invention what I claim is:

A piston of the class described including a head comprising an end portion and wall portion, a sectional skirt portion, hood members connecting the sections of said skirt portion, and rib members integrally connecting the sections of the skirt with the end of the head member.

In testimony whereof I affix my signature, in presence of two witnesses.

ROLAND M. HOWDESHELL.

Witnesses:
 EMIL STOREK,
 ELSE M. SIEGEL.